VARIABLE LENGTH DELAY APPARATUS

Filed March 30, 1966

INVENTOR
R. N. KENNEDY
BY
G. E. Hirsch Jr.
ATTORNEY

United States Patent Office 3,460,045

Patented Aug. 5, 1969

3,460,045

VARIABLE LENGTH DELAY APPARATUS

Richard N. Kennedy, Mendham, N.J., assignor to Bell Telephone Laboratories, Incorporated, New York, N.Y., a corporation of New York Filed Mar. 30, 1966, Ser. No. 538,676
Int. Cl. H03k *5/18;* H03b *3/04*
U.S. Cl. 328—177 10 Claims

ABSTRACT OF THE DISCLOSURE

A system for imparting a smoothly variable delay to a message signal is achieved by means of a domain wall register arrangement under control of a variable frequency signal source. Applied message signals are sampled and converted to pulse form, the pulses are delivered in parallel to different delay positions in a domain wall shift register, and delayed pulses are individually recovered from the register system and restored to analog form. By employing the same variable frequency oscillator to control sampling, encoding, decoding, and data shifting, signal delay is achieved which is smoothly variable over a considerable range.

Figures 1, 2:
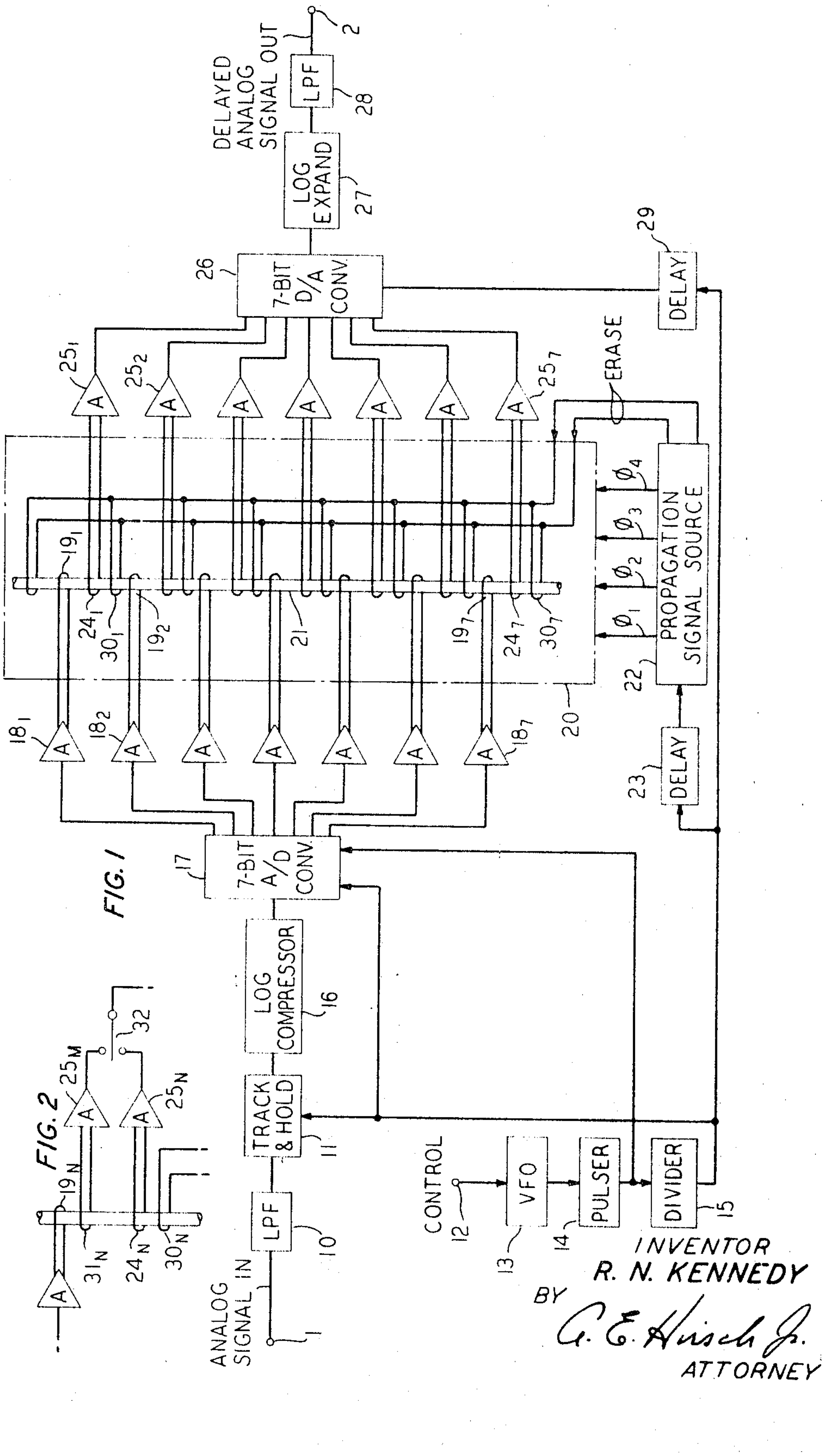

This invention relates to variable delay systems and more particularly to apparatus for introducing a delay to message signals that is variable over a broad range.

Signal processing systems, for example, systems employed for altering the frequency or bandwidth characteristics of information-bearing signals, such as speech signals, often utilize devices for delaying selected portions of one signal relative to another. Moreover, it is often desirable that the extent of the delay be under the control of an operator or an applied signal.

Previously proposed delay systems typically employ lumped constant elements with taps selectively available between sections of the line, or complex systems for the translation of the frequency of a signal, delay in an active network, and retranslation. Both systems are complex and often lack the breadth of control necessary for signal processing.

It is an object of this invention, therefore, to introduce a readily variable interval of delay in an information signal under the control of an external stimulus.

In accordance with the invention, an information signal is initially converted from an analog state to a binary encoded state. In its encoded form the signal is stored, binary digit (bit) by binary digit, in individual sections of a domain wall register. All of the bits, which together define a sample of the analog signal, are simultaneously stepped through the sections of the register, in response to a propagating signal synchronized with the encoding action. Since stepping action in the register takes place in real time, each bit emerging from the register is delayed by an interval determined by the number of stepping positions and the rate of signal propagation in the register. Each digit is thereupon read out, and all recovered bits together are decoded to form a replica of the applied sample of an information-bearing signal. Suitable filtering restores the decoded signal to a form suitable for use.

During the interval in which each encoded signal sample is stored in the domain wall register, it is in accordance with an important feature of the invention to afford continuous alteration of the extent of the delay imparted to registered signals. Thus, changes in the character of the propagating signal, which are effective to alter the rate of propagation of information through the register, and hence to alter the delay character of the domain wall device, are secured through a change in a master control system. Accordingly, corresponding changes are made in the sampling, coding and decoding operations so that synchronism is maintained throughout the system.

The nature of the present invention, its objects, and its various features and advantages will appear more fully upon a consideration of the illustrative embodiment described in detail in connection with the accompanying drawings in which:

FIG. 1 is a block schematic diagram of a delay system in accordance with the present invention, and FIG. 2 is an illustration of an alternative arrangement for entering and recovering information from the domain wall register employed in the practice of the invention.

In the apparatus illustrated in FIG. 1, an analog signal, for example, a speech signal occupying a frequency band extending to a nominal 4,000 cycles per second, supplied to terminal 1, is processed by restricting its frequency content in low-pass filter 10 to a range that can be accommodated by the system. For the example given, filter 10 restricts the range of applied signals to 4,000 cycles per second. Processing continues in track-and-hold network 11 wherein the momentary amplitude of the varying message signal is registered. At any instant, designated by the application of a control signal, the last registered amplitude is preserved, as by holding. The last registered value is rejected when a new control pulse signifies that new information is to be admitted to the network. Alternatively, network 11 may comprise a so-called sample-and-hold device, in which event a control pulse is effective to briefly sample the applied signal and preserve an indication of the magnitude of the sample until the next control pulse is employed to resample the signal. Both track-and-hold, and sample-and-hold networks are well known in the art.

In the apparatus of FIG. 1, the control signal for initiating a hold operation is derived from a control network which includes the tandem connection of an input 12 for external control signals (or a manually operated oscillator control element), variable frequency oscillator 13, pulser 14, and divider network 15.

Whatever the sampling technique, the sampled value is passed to analog-to-digital converter 17. Logarithmic compressor 16 may, if desired, be interposed between sampler 11 and converter 17 to impart a logarithmic amplitude characteristic to signal samples to improve coding accuracy. Converter 17 transforms the analog signal to a binary pulse code signal. Preferably, a 7-bit pulse code signal is employed in order that a close approximation to the instantaneous magnitude of the applied signal may be preserved. Converter 17 is under control both of the control signals derived from divider 15 and also of the control signals derived from pulser 14. Signals from divider 15 are employed to initiate each encoding operation; signals from pulser 14, which pulses occur at a substantially higher rate than those from divider 15, are responsible for the multi-step operation through which samples are converted into a multiple-bit binary signal. For example, so-called successive-approximation analog-to-digital conversion, well known in the art, may be used.

Individual signal bits derived from converter 17 are individually amplified as required in amplifiers $18_1$ through $18_7$ and employed to energize nucleating windings $19_1$ through $19_7$ of domain wall register apparatus 20. Domain wall apparatus 20 typically employs a longitudinal magnetic medium, such as a wire 21, under the influence of a multiplicity of controlled propagating coils in close proximity to magnetic wire 21. Information supplied by amplifiers 18 and windings 19 thus serve to nucleate the wire and establish magnetic domains on the wire. Application of a controlled sequence of propagating signals, $\varphi_1$, $\varphi_2$, $\varphi_3$, and $\varphi_4$, from signal source 22 serves to move the magnetic domains along the wire. In the figure, propagation signals originate in signal source 22 in response to control signals supplied from divider 15 by way of delay element 23. The mechanism by which magnetic domains are propagated along a magnetic wire is described fully by K. D. Broadbent in Patent No. 2,919,432, and the construction of a suitable multisection domain wall register is described in a copending application of P. Mecklenburg-L. H. Young, Ser. No. 533,155, filed Mar. 10, 1966.

In well-known fashion, the propagating signals from source 22 thus move the domains stepwise along the wire. At any later time, each read winding—e.g., $24_1$ through $24_7$ placed in the proper sense about magnetic wire 21, produces a signal in accordance with the specification of the domain then proximate to the winding. Each such signal is amplified in one of amplifiers $25_1$ through $25_7$, as required, and applied to digital-to-analog converter 26.

Inasmuch as each bit of the coded signal from converter 17 is simultaneously applied to one of the nucleating windings 19, and since each resulting domain is propagated simultaneously and to the same extent in domain wall register 20, each domain serves simultaneously to energize one of read windings 24 and thus to produce at the output of amplifiers 25 a 7-bit signal which is a delayed replica of the one produced by converter 17. This signal is thereupon passed through converter 26 to produce an analog replica of the signal applied to converter 17. Synchronism throughout is preserved by energizing digital-to-analog converter 26 by control signals derived from divider 15. Delay element 29 is employed, as required, to compensate for the response time of the several elements in the processing network.

The restored signal is passed through logarithmic expander 27 to remove the logarithmic characteristic introduced by compressor 16, and then through low-pass filter 28, which may be identical to filter 10, to produce a replica of the applied analog signal. The relation, in time, of the output signal at terminal 2 to the input signal is thus a function of the rate at which individual domains in magnetic medium 21 are propagated along the medium, and the length of the medium measured in bit units.

Following the readout of each domain from magnetic wire 21, the domain is erased from the wire, for example, by an erase (or bias) signal generated in propagation signal source 22 and applied to windings $30_1$ through $30_7$, in order that magnetic wire 21 is in an unnucleated state as the domain portion reaches the next nucleating winding 19. Alternatively, magnetic wire 21 may be physically serrated following each readout winding 24 in the direction of domain propagation. In either event, the use of a multisection domain register is preferable to the use of separate domain devices. Synchronous stepping is assumed and, from an economic standpoint, domain wall apparatus including a magnetic wire and a plurality of identical windings is more conveniently manufactured in long chains.

In a typical system for delaying analog speech signals, a minimum sampling rate of 8,000 samples per second is required. Thus, using 7 bits per sample, a data rate of 8 kilobits per second is required for each of 7 parallel channels. By shifting each of the 7 bits of each sample through approximately 400 bits positions in the domain wall register, a delay of approximately 50 milliseconds may be achieved. Accordingly, the domain wall device should be equipped with at least 400 bit positions between each pair of read and write windings. The total length of a typical domain wall register for a 7-bit signal is approximately 2,800 bits.

In accordance with the invention, the shifting rate of the domain wall register may be varied over a range from approximately 8 kilobits to 16 kilobits per second. This is accomplished by assuring that the primary control pulse rate is sufficiently high to permit all sampling, coding, and delay functions to be completed in the interval between consecutive control pulses. In a typical system, variable frequency oscillator 13, under control of a signal applied to terminal 12, is arranged to assure that several noncoincident pulses are available between consecutive control pulses. A typical 7-bit analog-to-digital converter requires nine consecutive pulses to encode a sample into a 7-bit digital code signal. Hence, the primary pulse rate must be sufficiently high to allow the encoding operation to be completed between consecutive propagating control pulses. To simplify the instrumentation of the system, it has been found convenient to select a primary frequency of oscillation twenty times as great as the required propagating pulse frequency. This rate is high enough to assure data sampling and conversion. In practice, an oscillator frequency variable over a range of 160 to 320 kilocycles per second meets the requirements established above. Thus, primary pulses within a range of 160 to 320 kilocycles from pulser 14, are used directly to energize converter 17, but are counted down by a factor of 20 in divider 15 before being used to energize source 22, track-and-hold network 11, and converters 17 and 26.

In the example given above, employing a pair of read and write windings separated by 400 bits, a primary control signal at 160 kilocycles, gives rise to a sampling rate of eight kilocycles per second and a signal delay of 50 milliseconds. As the control oscillator is adjusted to increase the primary control rate to 320 kilocycles per second, a delay of 25 milliseconds is produced. The range of delay is continuously variable between these values.

If desired, an extra set of read windings may be placed on the magnetic element between the write windings and the read windings. Thus, the auxiliary set of read windings permits the basic range of delay of the device to be selected without adjusting the frequency of oscillator 13. FIG. 2 shows a suitable arrangement. Auxiliary winding 31 (one of $n=7$ such windings) is interposed between write winding 19 and read winding 24. It supplies, as winding 24, a signal by way of amplifier 25 to one pole of switch 32. The selected output signal is supplied to digital-to-analog converter 26. Preferably each pole of switch 32 is actuated in synchronism with the others—e.g., by ganging, to effect the change of range. If the extra set of read windings is placed at bit position 200 on each section of the line, a delay range is provided from 25 to 12.5 milliseconds. Accordingly, the system has a delay range from 12.5 to 50 milliseconds.

Although the principles of the invention have been described primarily in terms of a "straight line" domain wall register, it will be apparent to those skilled in the art that various other structural arrangements may be employed for the domain wall register function. For example, a drumlike system may be employed in order that the advantages of simplified propagation winding construction may be realized. Various other modifications and arrangements will occur to those skilled in the art without, however, departing from the spirit and scope of the invention.

What is claimed is:

1. Apparatus for delaying analog signals which comprises a variable frequency signal generator means for controllably altering the frequency of said signal generator,
   - means responsive to said generator for developing periodic control signals,
   - means for encoding samples of an analog signal as code groups of pulses in response to selected control signals,
   - a multichannel domain wall register,
   - means for sequentially delivering the pulses of said code groups to individual channels of said register,
   - means for effecting the progression of pulses through said register at a rate determined by the momentary frequency of said signal generator, means for sequentially recovering the pulses of said code groups propagated through said register, and means for converting said recovered groups of pulses to analog signals in response to selected control signals.

2. Apparatus as defined in claim 1 wherein, each channel of said multichannel domain wall register includes, in circuit relation with a magnetic domain wall wire, a nucleating winding, at least one read winding, and erase means in spaced apart relation to one another.

3. Apparatus as defined in claim 1 wherein, each channel of said multichannel domain wall register includes, in circuit relation wtih a magnetic domain wall wire, a nucleating winding, two read windings, and erase means in spaced apart relation to one another, and means associated with said means for recovering the pulses of said groups propagated through said register for recovering pulses from a selected one of said read windings in each of said register channels.

4. Apparatus for delaying electrical signals which comprises, in combination, frequency adjustable means for generating repetitive control signals, means responsive to said control signals for encoding samples of an applied electrical signal as groups of pulses, a multichannel domain wall shift register, means for simultaneously writing each pulse of a group of pulses in individual channels of said register, means responsive to said control signals for propagating said pulses through said register, means for simultaneously reading pulses propagated through said register to produce a group of pulses, means responsive to said control signals for decoding delayed groups of pulses to produce a delayed replica of said applied electrical signal, and means for adjusting the frequency of said control signal adjusting means.

5. Apparatus as defined in claim 4 wherein, said domain wall shift register includes a magnetic domain wall wire, and wherein, said means for simultaneously writing each pulse of a group of pulses in individual channels of said register includes a plurality of individual nucleating windings at spaced apart locations along said wire, and wherein, said means for simultaneously reading pulses propagated through said register includes a plurality of read windings at spaced apart locations along said wire.

6. Apparatus as defined in claim 5 in further combination with a plurality of domain erase means, each one of which is spaced along said wire with relation to said nucleating and said read windings associated with one of said channels.

7. Apparatus for delaying analog signals which comprises, in combination, variable frequency oscillator, means responsive to said oscillator for generating periodic control signals at first and second integrally related rates, a source of an analog signal, means responsive to control signals at said first rate for periodically sampling an analog signal supplied from said source, means responsive to control signals at said first and said second rates for converting successive samples of said analog signal to a multibit digital signal, a multichannel domain wall shift register, means responsive to control signals at said first rate for developing a plurality of timed drive signals, means for sequentially delivering the individual bits of said digital signal to individual channels of said register, means responsive to said drive signals for stepping signals delivered to said individual register channels through said register, means for recovering signals from each of said register channels to produce a delayed multibit digital signal, means responsive to control signals at said first rate for converting the individual bits of said delayed digital signal to samples of an analog signal, means including a low-pass filter for converting said delayed samples to a replica of said supplied analog signal, and means for controllably altering the frequency of said variable frequency oscillator, thereby to control the rate at which said supplied analog signals are converted to a digital signal, stepped through said register, and converted to a delayed analog signal.

8. Apparatus as defined in claim 7 wherein said means for sequentially delivering signals to individual channels of said register includes, for each channel, a nucleating winding associated with a magnetic domain wall medium, and wherein said means for recovering signals from each of said register channels includes at least two read windings associated with said magnetic domain wall medium, said read windings being spaced apart in relation to each other and to said nucleating winding associated with said channel, and wherein said means for reading signals from each of said register channels further includes means for selectively delivering as an output, signals developed by one of said read windings.

9. Apparatus as defined in claim 7 wherein said periodic control signals at said second rate occur at a rate at least twenty times the rate of occurrence of control signals at said first rate.

10. Apparatus as defined in claim 7 wherein said means for developing a plurality of timed drive signals includes, means responsive to each control signal at said first rate for developing sequentially at least four discrete drive signals.

References Cited

UNITED STATES PATENTS 3,334,343 8/1967 Snyder ------------- 340—174

ROBERT L. GRIFFIN, Primary Examiner

W. S. FROMMER, Assistant Examiner

U.S. Cl. X.R.

328—155; 340—174